April 18, 1961 D. KATZ 2,980,899

DIGITAL TO ANALOG CONVERTER

Filed April 5, 1957 2 Sheets-Sheet 1

INVENTOR
D. KATZ
BY Walter M. Hill
ATTORNEY

DIGITAL TO ANALOG CONVERTER

Filed April 5, 1957 2 Sheets-Sheet 2

INVENTOR
D. KATZ

BY Walter M. Hill
ATTORNEY

United States Patent Office 2,980,899

Patented Apr. 18, 1961

2,980,899

DIGITAL TO ANALOG CONVERTER

David Katz, Springfield, N.J., assignor to Bell Telephone Laboratories, Incorporated, New York, N.Y., a corporation of New York Filed Apr. 5, 1957, Ser. No. 650,922

5 Claims. (Cl. 340—347)

This invention pertains to analog converters, and particularly to an analog converter comprising magnetic amplifying means the output of which varies in accordance with a predetermined weighting characteristic in response to a plurality of input signals.

The development of a voltage or current which is proportional to the sum of the products of a plurality of separate electrical signals by respective predetermined constants is of major importance in electrical computing systems, and is termed "analog conversion." In electrical computing systems wherein each quantity is expressed in a digital code, the digits are represented by individual electrical signals which signify their code values. The possible digital values extend from zero up to one unit less than the radix of the code employed, the code value of any quantity being equal to the sum of the products of the code values of its successive digits multiplied by successively greater powers of the radix. Analog conversion of such a digital quantity is more specifically identified as "digital-to-analog" conversion. A great many types of digital-to-analog converters are known, a variety of these being described in general terms in the article "A Systematic Survey of Coders and Decoders" by B. Lippel, appearing on pages 109 through 119 of the Convention Record of the Institute of Radio Engineers, 1953 National Convention, Part 8—Information Theory. The digital code in most common usage is the binary number system, wherein the possible digital values comprise only "0" and "1.". This has the advantage that each digit can be easily represented by either the presence or absence of a voltage. Digital-to-analog converters for binary numbers are known as "binary-to-analog" converters.

One type of binary-to-analog converter operates in accordance with a weighting principle, which may be illustrated by an arrangement comprising a transformer having a single primary winding and an individual secondary winding for each digit in the largest binary quantity to be converted. The numbers of turns of the secondary windings are weighted in proportion to the decimal values of successively higher binary orders, or powers of "two," and switching means are provided to selectively connect any one or more of the secondary windings in series with an output load. The switching means responds to signal currents respectively representing the digits of the input quantity to be converted by connecting only those secondary windings in series with the load which are weighted to a degree corresponding to the binary orders of those digits having the binary value "1." An alternating supply voltage applied to the primary winding of the transformer then produces a load voltage of a magnitude proportional to the sum of the products of all the "1" digits multiplied by the powers of "two" corresponding to their binary orders. That voltage is therefore an analog of the value of the input quantity, and may be utilized to provide a visual numerical or graphical display or to control voltage response equipment.

However, the accuracy of such a converting arrangement is limited by the degree to which the amplitude of the supply voltage applied to the primary winding of the transformer can be maintained precisely constant. This necessitates use of expensive and cumbersome voltage regulating equipment. Similar disadvantages are involved in the use of the relatively complicated switching means for enabling low power digital signal currents to control the flow of considerable power to the load. In addition, since such means are inherently binary in nature, the applicability of the circuit is limited to binary-to-analog conversion alone.

Accordingly, an object of this invention is to provide an improved analog converter of the weighted type.

A further object is to provide a weighted type of analog converter wherein the same elements which provide the required weighted characteristic serve to provide a large power gain between the signal source and the load.

A further object is to provide a weighted type of analog converter which inherently provides electrical and magnetic isolation between the load and the signal source.

The invention comprises a magnetic amplifying circuit having a plurality of signal windings which are magnetically linked by a plurality of magnetic cores to a plurality of load windings. The load windings are connected to an alternating voltage supply in series with coupling means. The coupling means may be directly connected to an output load, but in most cases rectifying means is included between the two. A plurality of signal currents, the sum of the products of the amplitudes of which by respective constant factors determines the value of a required function, are respectively applied to the signal windings. The portion of the voltage-time integral of such half cycle of the supply voltage which is required to produce flux saturation of a magnetic core linking each load winding is established as a weighted function of which signal windings are supplied with signal currents. This weighting is in the same proportion for successive signal windings as the respective constant factors for the signals applied thereto, and is effected either by proportioning the relative numbers of turns of the signal windings, or the relative numbers of turns of the load windings, or the relative cross-sectional areas of the magnetic cores, or by combinations of the foregoing. The resultant voltage and current thereby produced at the load is proportional to the value of the required function, and so is the analog thereof.

Further objects and additional features of the invention are set forth in the following specification and accompany drawings, in which.

Figures 5, 6:
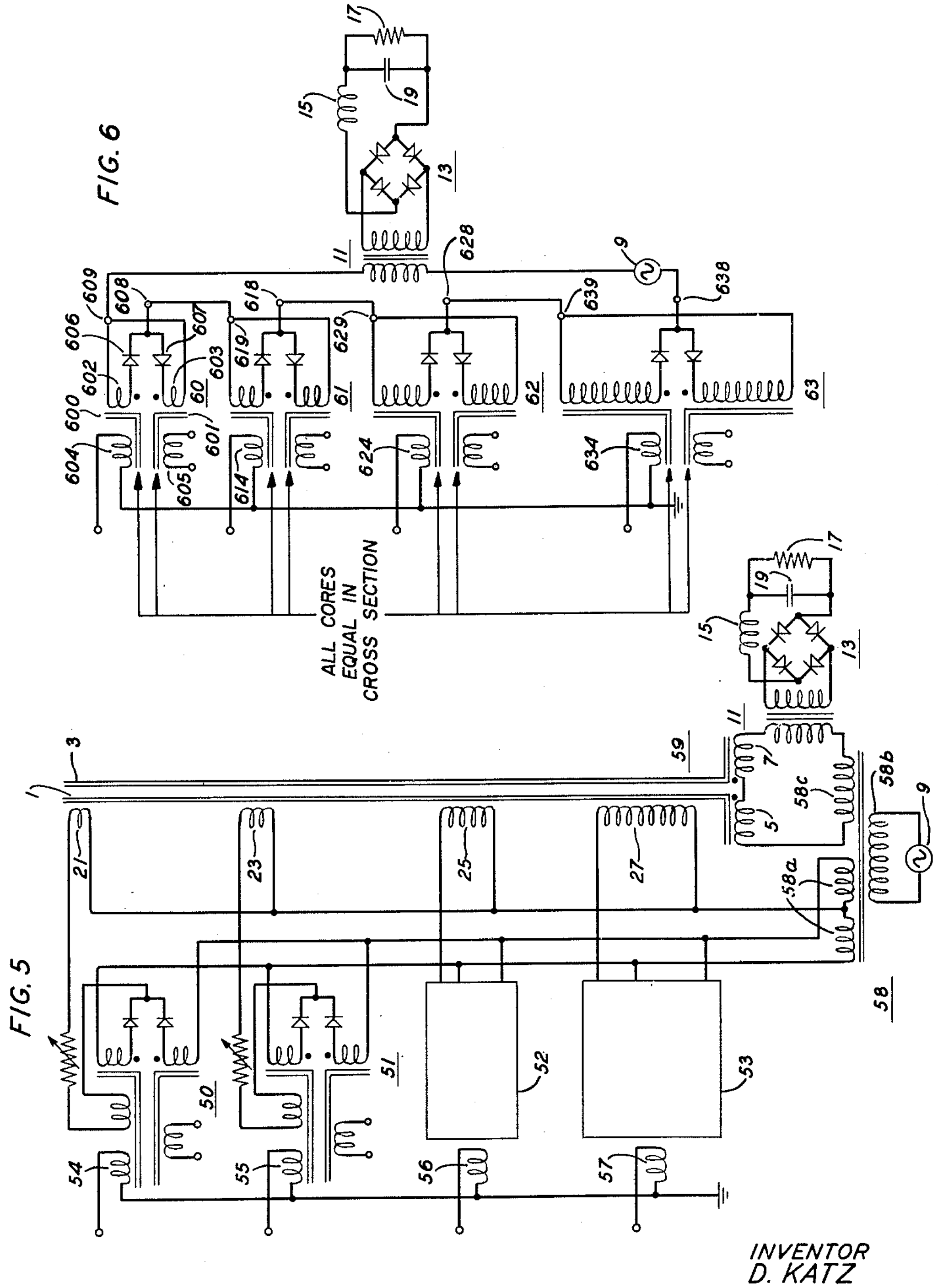

Fig. 5 is a circuit drawing of a digital-to-analog converter wherein a bistate magnetic amplifier is connected in advance of each of a plurality of weighted signal windings of a linear magnetic amplifier; and Fig. 6 is a circuit drawing of a plurality of bistate magnetic amplifiers connected in series, the numbers of turns of the load windings of successive amplifiers being weighted in accordance with the invention.

A conventional non-feedback magnetic amplifier comprises a pair of magnetic cores respectively linked by a pair of load windings and a signal winding linking both cores. A direct current or voltage signal to be amplified is applied to the signal winding. The load windings, which both have the same number of turns, are connected either in series or in parallel with an output load which is in series with an alternating voltage power supply. The relative directions of the turns of the two load windings are such that the fundamental power frequency voltages they induce in the signal winding are in opposition and so balance out. In this way a signal source connected to the signal winding is isolated from fundamental power frequency voltages. The current produced in the load windings will alternate at the same frequency as that of the power supply, and will have a square wave form if current of twice the power supply frequency is prevented from circulating either in those windings or in the signal winding. If such second harmonic current is permitted to circulate, the wave form of the load current will be a series of alternating and relatively sharp pulses. In either case, each half cycle of the alternating current in the load windings will have an average value equal to the direct current in the signal winding multiplied by the ratio between the number of turns of each load winding to the number of turns of each signal winding. A more detailed discussion of this behavior of magnetic amplifiers is contained in the article "The Magnetic Amplifier" by W. C. Johnson, appearing in the July 1953 issue of Electrical Engineering, Volume 72, pages 583 through 588; and in Chapters 2 and 3 of the textbook "Magnetic-Amplifier Circuits" by W. A. Geyger, McGraw-Hill Book Company, Incorporated, 1954.

Figure 1:
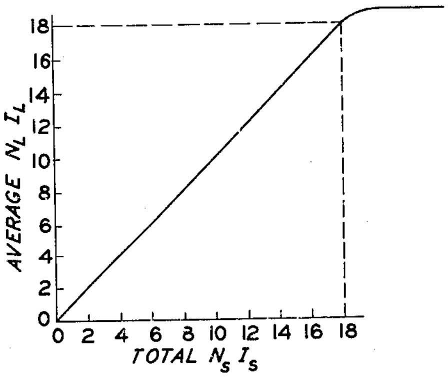
Fig. 1 is a graph of the transfer characteristic of a simple non-feedback linear magnetic amplifier, commonly called a saturable reactor.

The transfer characteristic of a magnetic amplifier is the relation between the product of the number of turns ($N_S$) and the direct current ($I_S$) carried by the signal winding and the product of the number of turns ($N_L$) and the rectified average value ($I_L$) of the current in each load winding. These products are, respectively, proportional to the direct magnetomotive forces of the signal and load windings. The transfer characteristic of a non-feedback magnetic amplifier is shown in Fig. 1. As seen, it is a straight line virtually through the origin at a slope of 45 degrees, so that the amplifier is "linear," and obeys the equation $N_L I_L = N_S I_S$. When the signal winding ampere-turns reaches a value such that the amplifier is resistance limited by having its power supply voltage developed entirely across its load, a further increase in signal current has no further effect on the load current and the transfer characteristic becomes a horizontal line. Since the signal winding may have many more turns than each load winding, a large current gain may be achieved. In addition, since the impedance levels of the signal and load circuits can differ, large power gains may be obtained. In view of the linearity of the transfer characteristic, if a plurality of signal windings are provided, each carrying direct currents the net ampere-turns product of all signal windings will simply be the sum of the ampere-turns products of the individual signal windings. In the case of a magnetic amplifier circuit wherein the rectified load current is fed back to the signal winding or to a separate feedback winding, the slope of the transfer characteristic increases beyond 45 degrees. Such a characteristic is shown in Fig. 4*b* of the article by W. C. Johnson cited above. Since it is linear, the ampere-turns product of a plurality of signal windings for such an amplifier also obeys the summation rule stated above.

Figures 2, 3, 4:
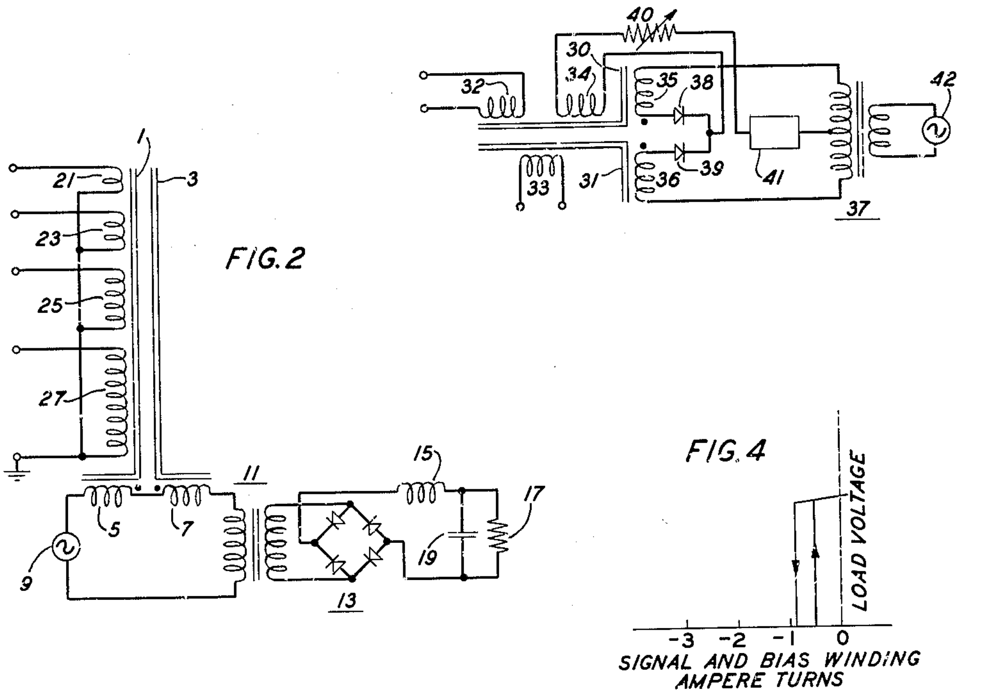
Fig. 2 is a circuit drawing of a non-feedback magnetic amplifier having a plurality of weighted signal windings in accordance with the invention.
Fig. 3 is a circuit drawing of a typical bistate magnetic amplifier.
Fig. 4 is a graph showing the transfer characteristic of the bistate magnetic amplifier of Fig. 3.

Fig. 2 is a circuit drawing of a simple non-feedback linear magnetic amplifier constructed in accordance with the invention. A pair of magnetic cores 1 and 3 are respectively linked by load windings 5 and 7 which are connected in series with an alternating voltage power supply 9 and the primary winding of a transformer 11. The dots adjacent to load windings 5 and 7 indicate, in accordance with convention, that the winding directions are such as to produce fluxes in opposite direction in cores 1 and 3. The secondary winding of transformer 11 is connected across the input terminals of a full wave rectifier 13, the output terminals of which are connected across an inductor 15 and a load resistor 17 in series. A capacitor 19 is connected in shunt with load resistor 17. This capacitor and inductor 15 together serve as a filter for preventing the alternating component of the rectified current produced by rectifier 13 from reaching load resistor 17. Four signal windings 21, 23, 25 and 27 respectively link both of cores 1 and 3. The voltage of supply 9 is established so it just fails to produce saturation of either of cores 1 and 3 when no signal current is supplied to any of the signal windings. However, even in the absence of any current in those windings, some alternating exciting current will flow in load windings 5 and 7 from supply 9. This current will be small, because of the very large impedance of the load windings when cores 1 and 3 are unsaturated. However, if it reached load 17 an output error voltage would be produced. That is, the output voltage should be zero when the current applied to each signal winding is zero. This exciting current is isolated from load 17 by transformer 11, which may be selected to require sufficiently greater excitation than the magnetic amplifier so that no voltage is produced across the transformer secondary winding when only that current flows in the primary winding. While other methods for balancing out the effect of exciting current are known, as discussed in Chapter 5 of the textbook by W. A. Geyger cited above, the arrangement used in Fig. 2 is both simple and reliable.

Suppose now that the circuit of Fig. 2 is to be utilized for analog conversion of binary numbers having a maximum of four binary digits, or "bits." The decimal values of the binary orders involved may, therefore, be considered to be $2^0$, $2^1$, $2^2$, $2^3$. It is further supposed that each bit is represented by the presence of a direct current of amplitude I if it is a "1," and by the absence of any current if it is a "0." The numbers of turns of signal windings 21, 23, 25, and 27 are, accordingly, respectively weighted in the proportion $2^0:2^1:2^2:2^3$. If a direct current of amplitude I is applied to signal winding 21, and if the actual number of turns of that winding is denoted $N_O$, the resultant ampere-turns of winding 21 will be proportional to $N_O I$. If such a current is applied to winding 23, its ampere-turns will be $2N_O I$. Similarly, the same current applied to windings 25 and 27 will, respectively, produce ampere-turns of $4N_O I$ and $8N_O I$. In accordance with this arrangement, the bits of a binary input number to be converted are applied in ascending binary order to windings 21, 23, 25, and 27. The total signal winding ampere-turns to which cores 1 and 3 are subjected will then be the sum of the ampere-turns of all the signal windings. Consequently, for each binary number of four bits or less the total signal winding ampere-turns will be as shown in the following Table 1:

*Table 1*

| Binary Number | Total Signal Winding Ampere-Turns in Units of $N_O I$ |
|---|---|
| 0000 | 0 |
| 0001 | 1 |
| 0010 | 2 |
| 0011 | 3 |
| 0100 | 4 |
| 0101 | 5 |
| 0110 | 6 |
| 0111 | 7 |
| 1000 | 8 |
| 1001 | 9 |
| 1010 | 10 |
| 1011 | 11 |
| 1100 | 12 |
| 1101 | 13 |
| 1110 | 14 |
| 1111 | 15 |

It is evident that the total signal winding ampere-turns is proportional to the decimal value of the binary number being decoded. Since the average value of each half cycle of the current in load windings 5 and 7 is proportional to the total signal winding ampere-turns, as described above, that average value will also be proportional to the decimal value of the binary number being decoded. The accuracy of this proportionality will be substantially independent of changes in the voltage of supply 9, being determined solely by the turns ratio between the load and signal windings.

The current in load windings 5 and 7 flows through the primary winding of transformer 11, producing a proportional current in the secondary winding. This current is rectified by rectifier 13, producing a direct current equal to the average value of the current in load windings 5 and 7 over each half cycle. The accompanying alternating current ripple produced by rectifier 13 is filtered by inductor 15 and capacitor 19, so that only the rectified direct current reaches load 17. As a result, the load current and voltage are proportional to the decimal value of the binary number applied to the signal windings of the magnetic amplifier. All of the power delivered to load 17 is supplied from source 9, the source of the digital signals applied to the signal windings being electrically isolated from the load. A large degree of power amplification may thereby be achieved.

While the embodiment of the invention shown in Fig. 2 was described in terms of the binary-to-analog conversion of binary numbers having at most four bits, it is evident that binary numbers having any number of bits could be converted by simply providing an additional binary weighted signal winding for each of the additional bits. It is also apparent that digital quantities in virtually any digital code could be converted to their analog equivalent by a circuit substantially the same as that of Fig. 2 so long as all digits in the code are distinguished on a current or voltage amplitude basis. For example, suppose that the object is analog conversion of ternary numbers. The radix of the ternary code is three, so that successive signal windings of the magnetic amplifier in Fig. 2 would be weighted in successive multiples of "three" rather than "two." Then, assuming that a "0" is represented by the absence of a signal current, a "1" by a direct current of amplitude I, and a "2" by a direct current of amplitude 2I, the circuit will operate in substantially the same manner as described but will effect ternary to analog conversion.

By utilizing ternary weighting of the signal windings of the circuit in Fig. 2, analog conversion of ternary numbers having digits which are distinguished on a current or voltage polarity basis rather than an amplitude basis can also be accomplished. This would be the case if the digits in the ternary code are either "0," "+1," or "−1," and if a "0" is represented by the absence of a signal current, a "+1" by a direct current of amplitude +I, and a "−1" by a direct current of amplitude "−I." A digital code of this type is described in British Patent 734,830, published August 10, 1955. The circuit would operate correctly by virtue of the fact that the linear transfer characteristic of the magnetic amplifier makes the net ampere-turns of two signal windings which carry current in opposite directions simply equal to the difference of the ampere-turns of the individual signal windings.

It should be noted that, although the circuit of Fig. 2 was described on the basis that the various signal currents are all of predetermined relative amplitudes, as is true of digital code systems, the circuit will operate equally well for the general case wherein the signal amplitudes are completely variable and wherein the various signals require different constant multipliers. This is the case for functions of the form $F(w, x, y, z)=aw+bx+cy+dz$, where $a$, $b$, $c$ and $d$ are constants and $w$, $x$, $y$, $z$, are variables. In such a case the relative numbers of turns of signal windings 21, 23, 25, and 27 would be weighted in the proportion $a{:}b{:}c{:}d$. If any of those constants should be negative, the signal winding corresponding to it may be wound in the opposite direction from the other signal windings. The amplitude of the output voltage produced across load 17 will then be an analog of the value of the required function.

Since the magnetic amplifier circuit of Fig. 2 is sensitive to the amplitudes of the signal currents applied to the signal windings, any variation in those amplitudes from the correct nominal value representing a "1" bit will produce an error in the current and voltage at load 17. In situations where the signal currents must pass through a number of intermediate networks before reaching the signal windings, some degree of amplitude distortion is always inevitable. Consequently, to maintain a high degree of conversion accuracy it is generally advisable to interpose some type of signal regenerating means before each signal winding. In addition, to retain the inherent advantages of magnetic amplifiers of freedom from the need for regulated power supplies and ruggedness of construction, it is preferable that such signal regenerating means also be constructed of magnetic amplifiers. The circuit of a typical bistate magnetic amplifier suitable for use as a binary signal regenerator is shown in Fig. 3, and comprises a pair of magnetic cores 30 and 31 both of which are linked by a signal winding 32, a bias winding 33 and a feedback winding 34. A pair of load windings 35 and 36 respectively link cores 30 and 31. One terminal of load winding 35 is connected to one terminal of the secondary winding of a transformer 37, the other terminal of that secondary winding being connected to one terminal of load winding 36. The remaining terminal of winding 35 is connected to the remaining terminal of winding 36 by a pair of oppositely poled diodes 38 and 39 in series. The junction of diodes 38 and 39 is connected to one terminal of feedback winding 34, the other terminal of that winding being connected in series with a rheostat 40 and a load 41 to a center-tap on the secondary winding of transformer 37. The primary winding of transformer 37 is connected to an alternating voltage power supply 42.

Diodes 38 and 39 conduct on alternate half cycles of power supply 42, producing a rectified direct current through feedback winding 34 and load 41. In addition, on alternate half cycles of power supply 42 current flows alternately in load windings 35 and 36, which are so wound that the fluxes they produce in adjacent legs of cores 30 and 31 aid the flux produced thereon by feedback winding 34. In the absence of a direct current signal applied to signal winding 32, virtually no current flows in load 41 because of the very high impedances of load windings 35 and 36. The same will be true even if a small signal current is supplied to winding 32, since a direct bias current is supplied (from a source which is not shown) to bias winding 33 in a direction which produces a flux in cores 30 and 31 opposing the flux produced in the cores by the current in feedback winding 34 and load windings 35 and 36. However, as the signal current supplied to winding 32 is increased it will reach a critical switching value at which the flux produced by bias winding 33 is overcome and cores 30 and 31 become saturated. The impedance of windings 35 and 36 then becomes very small, and a large current is produced in load 41. The magnitude of this current can be controlled by rheostat 40. After this has occurred, the large current flow in the load will continue until the signal current in winding 32 is reduced to a value somewhat less than that at which load current was initiated. Cores 30 and 31 then desaturate.

The foregoing mode of operation of the circuit of Fig. 3 is shown graphically in Fig. 4, wherein the total ampere-turns of signal winding 32 and bias winding 34 are plotted in arbitrary units against the voltage produced across load 41. From this hysteresis loop characteristic it is evident that if the current supplied to bias winding 33 produces bias ampere-turns of about −1 unit the load voltage will remain zero until the signal winding ampere-turns reaches a critical switching level of about +0.5 unit. When that occurs the total of the signal unit, and the load voltage abruptly assumes its maximum value. The current in signal winding 32 therefore serves only as a switching signal for the load voltage, its precise magnitude being unimportant except with regard to whether it is greater or less than the switching value. Accordingly, if the nominal amplitude of a "1" bit signal current applied to signal winding 32 is $I_S$, and if that winding has the same number of turns as bias winding 33, a direct current of amplitude $I_S$ supplied to the bias winding will assure that full load voltage will be produced across load 41 for all values of signal current equal to or greater than $$\frac{I_S}{2}$$

No load voltage will be produced for lesser value of signal current. This permits a tolerance in signal current amplitude of up to fifty percent of the nominal value of the amplitude representing a "1" bit.

In Fig. 5 four bistate magnetic amplifiers 50, 51, 52, and 53 are utilized to supply current to the signal windings 21, 23, 25, and 27, respectively, of a linear magnetic amplifier 59 substantially the same as that described above with reference to Fig. 2. These bistate amplifiers, respectively, have input windings 54, 55, 56, and 57 of which one terminal of each is grounded. Each of bistate amplifiers 50, 51, 52, and 53 is the same as the bistate magnetic amplifier described above with reference to Fig. 3. A terminal of one load winding of each of these amplifiers is connected to one terminal of a secondary winding 58*a* of a transformer 58. The other terminal of secondary winding 58*a* is connected to a terminal of the other load winding of each of amplifiers 50, 51, 52, and 53. The center-tap of winding 58 is connected to one terminal of each of signal windings 21, 23, 25 and 27 of linear amplifier 59, each of these signal windings being connected, respectively, in circuit with bistate amplifiers 50, 51, 52, and 53 in the same manner as load 41 is connected in the bistate magnetic amplifier circuit of Fig. 3.

Magnetic amplifier 59 includes a pair of load windings 5 and 7 in series with the primary winding of a transformer 11, the same as in Fig. 2. However, instead of directly connecting alternating current power supply 9 in series with those windings, it is connected across the primary winding 58*b* of transformer 58. An additional secondary winding 58*c* of that transformer is connected in series with load windings 5 and 7 and the primary winding of transformer 11, thereby enabling supply 9 to energize linear amplifier 59 and also each of bistate amplifiers 50, 51, 52, and 53. The secondary winding of transformer 11 is connected to load 17 by a rectifier and filter, as in Fig. 2. In addition, the numbers of turns of signal windings 21, 23, 25, and 27 are weighted in the proportion $2^0:2^1:2^2:2^3$, as in Fig. 2. The operation of the circuit of Fig. 5 will be identical to that of Fig. 2, except that variations of up to fifty percent in the nominal amplitude of the direct current representing a "1" bit applied to any of input windings 54, 55, 56, or 57 of bistable amplifiers 50, 51, 52, and 53 can be tolerated without producing any error in the analog conversion operation.

In the circuits of Figs. 2 and 5 it is necessary that the signals be direct currents or voltages. However, the principles of the invention are also applicable to digital-to-analog conversion of digital quantities the digits of which are represented by discrete pulses rather than by constant currents. For example, the circuit of either Fig. 2 or Fig. 5 would produce a pulse of current in load 17 having an amplitude which is the analog of the binary input number so long as all pulses representing "1" bits in the number are applied to the appropriate signal windings simultaneously. For such operation the period of power supply 9 should be about one-fiftieth or less that of the signal pulse period, and the time constant of the filter comprising inductor 15 and capacitor 19 should be no greater than about one-quarter of the signal pulse period. More often, however, it is necessary that the load voltage be continuous even though the digital signal currents are momentary pulses. Such an operating characteristic is easily achieved with the circuit of Fig. 5 by supplying the bias winding of each of the bistate magnetic amplifiers 50, 51, 52 and 53 with a direct current which is insufficient to produce core saturation but which is great enough to maintain the cores saturated once that condition is produced by a sufficient current in the signal winding. Referring to the bistate magnetic amplifier hysteresis loop characteristic in Fig. 4, the required bias winding current would be such as to produce an ampere-turns value lying within the loop. Suppose the value so established is in the center of the loop, or about three-quarters of a negative unit. Before any current is applied to the signal winding the output voltage of the bistable amplifier will be zero. If a current which produces signal winding ampere-turns of at least one-quarter of a positive unit occurs, full output voltage will be produced and will continue until the total ampere-turns of the bias and signal windings are reduced below about one negative unit. Resetting means for this purpose could simply consist of a pulse source connected to the bias windings of each of the bistable amplifiers and arranged to supply a current pulse to each of those windings just in advance of application of a new input number to the circuit for analog conversion. Such pulse resetting arrangements are well known in the digital computing arts. This current pulse should be in the same direction as the direct bias current, and of at least one-quarter the amplitude of the latter current.

In each of the embodiments of the invention described above the requisite weighting for effecting analog conversion is established by proportioning the numbers of turns of a plurality of signal windings of a single magnetic amplifier. However, the required weighting characteristic may also be established by proportioning other parameters of a complete magnetic amplifying circuit. This may be understood by considering the theory of operation of magnetic amplifiers. The relation between the voltage (V) across the load windings, the numbers of turns (N) of each load winding, the cross-sectional area (A) of each magnetic core, and the flux density (B) in each core is given by the equation $$\int V dt = KNA\Delta B \quad (1)$$

ΔB is the change in core flux density during a time ($t$) corresponding to the period of each half cycle of V, starting at zero when the half cycle starts and going to a maximum value when the half cycle ends. The maximum flux density ($B_s$) which a core can sustain, or the value of B at which the core saturates, is determined solely by the magnetic material of which it is constructed. Consequently, the maximum voltage-time integral which the load windings can support is $$\int V_m dt = KNAB_s \quad (2)$$

When a direct signal current is applied to any of the signal windings sufficient to produce core saturation in the amplifier, the maximum voltage-time integral which the load windings can support is thereby reduced to zero. As a result, instead of weighting the number of turns of the signal windings, weighting may be achieved by proportioning the products of load winding turns by core areas (NA) for successive amplifiers. An analog converter constructed on this basis is shown in Fig. 6.

The circuit of Fig. 6 is a four digit binary-to-analog converter comprising four magnetic amplifiers 60, 61, 62 and 63. Each of these amplifiers is the same as that of the "doubler" magnetic amplifier shown in Fig. 6 on page 238 of the article "A Magnetic Amplifier Switching Matrix" by the applicant, appearing on pages 236 through 241 of the May 1936 issue of "Communication and Electronics." This amplifier has a linear transfer characteristic similar to that shown in Fig. 1, but is somewhat steeper due to internal feedback. It can be made essentially bistate by providing the signal winding with a sufficient number of turns so that a signal current having the nominal amplitude of a "1" bit produces core saturation. The output voltage will then be virtually equal to that of the alternating power supply when the current supplied to the signal windings exceeds a definite value, and will remain virtually zero for lesser signal currents. Such a bistate characteristic is advantageous for digital-to-analog conversion, as stated above, because it provides for a large tolerance in signal amplitude variations from the nominal values.

Amplifier 60 comprises a pair of magnetic cores 600 and 601 respectively linked by load windings 602 and 603. Both cores are also linked by a signal winding 604 and a bias winding 605. The relative numbers of turns of the bias and signal windings, and the direct current supplied to the bias winding, are so chosen that a direct signal current of an amplitude at least equal to $$\frac{I_S}{2}$$

where $I_S$ is the nominal amplitude of the direct current representing a "1" bit, causes cores 600 and 601 to saturate. One terminal of load winding 602 is connected to one terminal of load winding 603, the other terminals of those windings being connected by a pair of oppositely poled diodes 606 and 607 in series. The junction 608 of diodes 606 and 607 constitutes one output terminal of amplifier 60, the junction 609 of windings 602 and 603 being the other output terminal of that amplifier. Each of amplifiers 61, 62 and 63 are the same as amplifier 60, and respectively have signal windings 614, 624, and 634. One terminal of each signal winding is connected to ground, the remaining terminals of these windings constituting the circuit input terminals for receiving binary signal currents. The output terminals of all amplifiers are connected in series, output terminal 608 of amplifier 60 being connected to output terminal 619 of amplifier 61, output terminal 618 of amplifier 61 being connected to output terminal 629 of amplifier 62, and output terminal 628 of amplifier 62 being connected to output terminal 639 of amplifier 63. Output terminal 609 of amplifier 60 and output terminal 638 of amplifier 63 constitute the output terminals of the compelte series connection of all four amplifiers, and are connected across the primary winding of a transformer 11 in series with an alternating current power supply 9. The secondary winding of transformer 11 is connected across the input terminals of a full wave rectifier 13, the output terminals of which are connected in series with an inductor 15 and a load resistor 17 which is by a capacitor 19. The portion of the circuit of Fig. 6 connected across and to the right of terminals 609 and 638 is identical with the portion of the circuit of Fig. 2 to the right of and including transformer 11 therein.

If the number of turns of each of the load windings of amplifier 60 is denoted by N, the numbers of turns of each of the load windings of amplifiers 61, 62 and 63 are respectively, 2N, 4N, and 8N. The sustainable voltage-time integral across the load windings of a magnetic amplifier is equal to $KNAB_s$, as explained above. Consequently, if all cores are constructed of the same magnetic material and have the same cross-sectional area, the sustainable voltage-time integrals of amplifiers 60, 61, 62, and 63, respectively, are in the proportion $2^0:2^1:2^2:2^3$. If the sustainable voltage-time integral for amplifier 60 is designated S, this sum is 15S. The supply voltage-time integral can be set equal to 15S by increasing the voltage of supply 9 until current just fails to flow in load 17. That is, the supply voltaget-ime integral required to saturate a core of each amplifier is the sum of the sustainable voltage-time integrals of all amplifiers.

The operation of the circuit of Fig. 6 will first be described when no current is applied to any of the signal windings. As the voltage of supply 9 begins either half cycle from the zero voltage level, it tends to send current through the series path comprising one load winding of each amplifier. Virtually all the supply voltage will initially appear across the load winding of the one of amplifiers 60, 61, 62 and 63 which requires the least exciting current, since that winding will present by far the highest impedance in the series path. After a definite time interval the flux established by the time integral of the voltage across the load winding will saturate the core linking it. The load winding impedance is then reduced almost to zero, and practically the full supply voltage appears across the load winding of the remaining one of the amplifiers which requires the next smallest amount of exciting current. After another definite time interval the core linked by that winding saturates, reducing the impedance of the winding almost to zero. The same process occurs successively in the remaining two amplifiers, so that a core of each eventually becomes saturated. Since the amplitude and frequency of the voltage of supply 9 have been chosen so that no current flows in load 17 in the absence of signal current in any signal winding, by the time a core of each amplifier has become saturated the supply voltage will have completed its half cycle back to zero. As a result, the largest current which can flow in the primary winding of transformer 11 is the largest exciting current of any of amplifiers 60, 61, 62, and 63. By selecting transformer 11 or one which requires considerably more exciting current, no voltage will be produced across its secondary winding and no load current or voltage is produced.

Now suppose that a direct current of amplitude I, representing a "1" bit, is applied to signal winding 604 of amplifier 60. This saturates cores 600 and 601, so that amplifier 60 no longer can sustain any voltage-time integral. Since power supply 9 produces a voltage-time integral in each half cycle proportional to 15S, and since all of amplifiers 61, 62 and 63 in series can only sustain a total voltage-time integral of 14S, the primary winding of transformer 11 will be subjected to a voltage-time integral in each half cycle of 1S. This will result in a direct current and voltage at load 17 proportional to 1S. If a direct current of amplitude I should instead be applied to signal winding 614 of amplifier 61, saturating cores 610 and 611, the excess of the supply voltage-time integral during each half cycle over the voltage-time integral which can be sustained by amplifiers 60, 62 and 63 in series will be proportional to 2S. The direct current and voltage at load 17 is then proportional to 2S. In a similar way, direct currents representing "1" bits applied to the signal winding of amplifiers 62 and 63 will, respectively, produce a direct current and voltage at load 17 proportional to 4S and 8S. Of course, if a "1" bit current is applied to the signal winding of more than one of the amplifiers, say to 614 and 624, the excess of the supply voltage-time integral over the total integral which amplifiers 65 and 71 can sustain, in this case 6S, will appear across the primary winding of transformer 11. The direct current and voltage at load 17 will then be increased by a factor of six relative to when only signal winding 604 was so energized. It is therefore apparent that that the circuit in Fig. 6 performs binary-to-analog conversion.

As explained above, the sustainable voltage-time integral of a magnetic amplifier is proportional to the NA product of the number of turns of each load winding and the cross-sectional area of each of the magnetic cores. Consequently, the requisite weighting for binary-to-analog conversion could be achieved by proportioning the cross-sectional core areas of successive amplifiers in Fig. 6 in successive multiples of two in lieu of so proportioning the numbers of turns of the load windings. The relative core areas would then be in the proportion 1:2:4:8 for amplifiers 60, 61, 62, and 63, respectively. Obviously, arrangements wherein part of the requisite weighting of the sustainable voltage-time integral of each amplifier is achieved by proportioning the core area and part by proportioning the number of load winding turns could also be used.

Still a further mode of weighting the sustainable voltage-time integrals of amplifiers 60, 61, 62, and 63 is applicable when each amplifier is operated as a linear amplifier instead of as a bistate device. That is, assume that none of the signal winding currents is sufficient to produce flux saturation of any of the amplifiers. Then part of the required weighting factors could be established by weighting the relative numbers of turns of the signal windings of successive amplifiers and the remainder (the quotient of the required factor divided by the signal winding weighting factor) by weighting their relative NA products. For example, if the signal windings of each of the amplifiers 62 and 63 in Fig. 6 were provided with twice as many turns as the signal windings of amplifiers 60 and 61, thereby establishing a weighting factor of "two," the remainders of the required "four" and "eight" weighting factors for these amplifiers can be attained by providing the load windings of amplifier 62 with 2N turns (instead of 4N turns) and the load windings of amplifier 63 with 4N turns (instead of 8N turns). An equal signal current applied successively to the control windings of amplifiers 60, 61, 62 and 63, this current being of an amplitude less than that required to saturate any core, will then result in a successively doubled current and voltage at load 17. In the case of amplifiers 60 and 61, since their signal windings have equal numbers of turns, the fluxes which the supply voltage must establish in the cores of both amplifiers to produce saturation are reduced by equal amounts by equal currents in their signal windings. However, since the load windings of amplifier 61 have twice as many turns as the load windings of amplifier 60, a reduction of the required flux by the same amount for both amplifiers results in a reduction in the sustainable voltage-time integral for amplifier 61 twice as great as the reduction of that integral for amplifier 60. The excess of the supply voltage-time integral in each half cycle over that sustainable by all amplifiers in series is, therefore, doubled when signal current is supplied to amplifier 61 relative to when an equal signal current is supplied to amplifier 60.

In the case of amplifier 62, since its signal winding has twice as many turns as amplifier 61, the same current in its signal winding will result in twice the reduction of the flux which the supply voltage must establish to produce core saturation. In view of the fact that the load windings of both amplifiers have the same number of turns, the sustainable voltage-time integral of amplifier 62 is reduced by twice the amount that integral is reduced for amplifier 61 when its signal winding is energized. As in the case of amplifiers 60 and 61, this results in a doubling of the excess of the supply voltage-time integral in each half cycle over that sustainable by all amplifiers in series. With regard to amplifier 63, since its load windings have twice as many turns as the load windings of amplifier 62, while the numbers of signal winding turns are equal, a weighting factor of "two" results for the same reasons stated above in relation to amplifier 60 and 61.

For a complete understanding of this type of compound weighting it is informative to directly consider the weighting between amplifiers 60 and 62, inasmuch as the control and load windings of the latter each has twice as many turns as the former amplifier. Equal direct currents in the signal windings establish twice the direct core flux density in amplifier 62 as in amplifier 60. In addition, due to the doubling of the number of turns of the load windings, establishment of a given flux density in a core of amplifier 62 by the supply voltage requires twice the portion of the supply voltage-time integral as for establishing the same flux density in a core of amplifier 60. Consequently, if equal direct signal currents established equal direct flux densities in the cores of amplifiers 60 and 63, the sustainable voltage-time integral of amplifier 63 in each half cycle would be reduced by twice the amount that integral is reduced in the case of amplifier 60. Sincfie equal signal currents actually result in twice the direct flux density in the cores of amplifier 63 as in the cores of amplifier 60, the relative amounts by which the sustainable voltage-time integrals of these amplifiers are actually reduced are in the ratio of 4:1.

It is to be understood that the arrangements shown and described in the instant drawing and specification are but illustrative of the application of the principles of the invention. Numerous other arrangements may be made by those skilled in the art without departing from the spirit and scope of the invention.

What is claimed is:

1. Apparatus for converting a permutation code group of *m*-valued signals with a preassigned radix into its analog counterpart, which comprises a plurality of input windings, a plurality of serially combined output windings and a plurality of magnetizable cores, each core being linked by one input winding and one output winding as a winding pair, the tandem connection of a common alternating current source and a common coupling means interconnecting the series combination of said output windings, a common load and a common rectifier connected to said coupling means, the several cores and the several windings being so proportioned that, for each core, the product of its cross section by the turns ratio of its winding pair is proportional to one of the sequence of integral powers of the radix, and connections for applying said signals to said input windings, one to each, whereby said analog counterpart is manifested in said load.

2. A circuit for converting a digitally coded signal into analog form comprising a plurality of said input signal sources, one for each digital $K_x$ of said coded signal, a plurality of magnetic amplifiers each having at least one magnetic core with signal and load windings linked thereby, said core having a correspondent in each of the several amplifiers, the load windings of the corresponding cores being series connected and the products of the cross sectional areas $A_x$ and the number of load winding turns $M_x$ of the several corresponding cores being variously selected in accord with the relationship $$M_xA_x=B^x$$

for which B is the radix of said coded signal and $x$ is the denominational order of said digit in said code, direct connections between signal windings of individual ones of said amplifiers and individual ones of said signal sources, coupling means, an alternating current source connected in series with said coupling means and the series connected load windings of said amplifiers, a load, and rectifying means connected between said load and said coupling means whereby a direct current, which is the analog of said coded signal, flows in said load in proportion to $$\sum_0^X K_xB^x$$

where X is the highest order of said digits.

3. Apparatus for converting a code group of binary valued signals into its analog counterpart, which comprises a plurality of nonlinear magnetic amplifiers, one for each binary signal, each such amplifier having a pair of saturable cores interlinked by a signal winding and by respective ones of first and second load windings in parallel connected branches including rectifying diodes, said load windings and said cores being so proportioned that the product of the number of turns of each load winding and the cross sectional area of the core interlinked thereby is proportional to the binary radix two raised to the power of the denominational order of the binary signal associated with said amplifier, means interconnecting a series combination of all of said parallel connected branches, said interconnecting means comprising load means and series connected source means for causing circulating currents saturating all of the cores of said amplifiers, said load means including means for rendering negligible the voltage developed thereacross by the flow of the saturation currents, thereby to cause substantially the entire time integral of the voltage of said source to be distributed in a binary fashion among said amplifiers, and means for applying to the signal windings of the various amplifiers the binary signals associated therewith, whereby, for the occurrence of the higher signal magnitude of various ones of the binary signals, the distributed time integrals of the voltage appearing across the amplifiers responding to the various signals are transferred from said amplifiers to said load means and manifested therein as said analog counterpart.

4. Apparatus for converting a group of individual binary input signals into an analog output signal having a magnitude proportional to the summation of the various binary input signals weighted according to their denominational orders and for simultaneously amplifying the analog output signal, which apparatus comprises the series combination of an energy source and a load, a magnetic amplifier for each distinctive input signal comprising means for sustaining a binary weighted fraction of the time integral of the voltage of said source proportional to the binary base number two raised to the power of the denominal order of said distinctive signal and means for causing the upper valued magnitude of said distinctive signal to displace said binary weighted fraction, and a closed loop formed by the series interconnection of said series combination and the sustaining means of each of said amplifiers, whereby the energy of said source available to said load is directly controlled by the sum total of the various fractions of said time integral displaced to said load by the upper valued magnitudes of various ones of said binary signals.

5. Apparatus for converting a group of binary code signals into an amplified analog output signal, which comprises energy source means for supplying a time varying voltage, a plurality of nonlinear and series connected magnetic amplifier means for receiving and sustaining in a binary distributed fashion thereamong substantially the entire time integral of the voltage of said energy source means, output means for extracting from said energy source means analog signal energy proportional to the difference between the time integral of the voltage developed across said series connected magnetic amplifier means and said entire time integral supplied by said energy source means, and means for connecting individual ones of the binary code signals to individual ones of the magnetic amplifier means, whereby said difference is of a negligible magnitude for lower valued ones of said binary code signals and increases discretely in a binary weighted fashion under the control of the upper valued ones of said binary code signals.

References Cited in the file of this patent

UNITED STATES PATENTS

| | | |
|---|---|---|
| 2,574,438 | Rossi | Nov. 6, 1951 |
| 2,736,881 | Booth | Feb. 28, 1956 |
| 2,738,504 | Gray | Mar. 13, 1956 |
| 2,762,038 | Lubkin | Sept. 4, 1956 |
| 2,792,564 | Ramey | May 14, 1957 |
| 2,817,079 | Young | Dec. 17, 1957 |
| 2,875,432 | Markow | Feb. 24, 1959 |

OTHER REFERENCES

IRE Proceedings, 1951, p. 1009, Cohen, "Analysis of Magnetic Amplifiers."